July 28, 1953 C. C. S. LE CLAIR 2,646,886
LIQUID OR OIL FILTRATION SYSTEM
Filed Oct. 22, 1947 5 Sheets-Sheet 1

July 28, 1953   C. C. S. LE CLAIR   2,646,886
LIQUID OR OIL FILTRATION SYSTEM
Filed Oct. 22, 1947   5 Sheets-Sheet 2

FIG. 8.

July 28, 1953 C. C. S. LE CLAIR 2,646,886
LIQUID OR OIL FILTRATION SYSTEM
Filed Oct. 22, 1947 5 Sheets-Sheet 5

Inventor:
Camille Clare Sprankling Le Clair
By Hinkle, Horton, Akleberg, Haumann & Wupper
Attorneys.

Patented July 28, 1953

2,646,886

UNITED STATES PATENT OFFICE 2,646,886

LIQUID OR OIL FILTRATION SYSTEM

Camille Clare Sprankling Le Clair, Acton, London, England, assignor to Tecalemit Limited, Brentford, England, a corporation of Great Britain Application October 22, 1947, Serial No. 781,337
In Great Britain November 11, 1946

11 Claims. (Cl. 210—166)

1

This invention relates to liquid or oil filtration systems, particularly those dealing with engine oil, and more specifically to filters for use in such systems.

One object of the invention is to provide a filter for use in filtration systems of the kind described and claimed in the specification of my United States Patent No. 2,423,329, which shall not only be an improvement of the filter therein described, but shall also be an improvement of the filter described in the specification of my copending application No. 743,581, issued as Patent No. 2,544,269 and dated March 6, 1951.

In the oil filtration system described in the specification of United States Patent No. 2,423,329, unfiltered oil was pumped through the filter inlet into the container and thence around and through the filter element in the latter, the filtered oil when flowed to the bearings via a main outlet passage which was connected to the bearings and which communicated both with the interior of the element and with a cylinder in which a spring-urged control valve of the piston type was slidable. The function of the control valve was to allow unfiltered oil to return to the sump from the container through an auxiliary outlet when the pressure of filtered oil in the main outlet passage exceeded a predetermined figure. In this manner, no unfiltered oil could reach the bearings and, further, the amount of oil passing through the filter element was only the net amount required by the bearings.

As expalined however in the specification of my application No. 743,581, it has been found in practice that the control of unfiltered oil by means of a slidable piston-type control valve may not be entirely satisfactory, since particles in the unfiltered oil may penetrate into the clearances between the piston and its cylinder causing the piston to stick and preventing its proper smooth functioning.

This disadvantage was overcome by the invention described in the last mentioned specification, whereby the flow of unfiltered oil back to the sump or other container was controlled by a seated, dirt cutting valve, and not by a valve of the piston type.

According to that invention, the control valve member comprised a valve head having a hardened dirt cutting edge which cooperated with a hardened valve seat surrounding a passage which communicated permanently with the oil inlet side of the filter, and which, when the valve was unseated, communicated with the subsidiary outlet, thereby permitting unfiltered oil from the filter

2 to return to the sump or other container, and a piston part which was exposed on the one side to the filtered oil pressure and on the other side to the thrust of a control spring.

Since the seated valve controlling the unfiltered oil was essentially unbalanced, being exploded to a one-way thrust of the unfiltered oil pressure acting on the area of its seat, it was essential, in order that the valve should be sensitive to the filtered oil pressure only, that the unfiltered oil pressure should be balanced. To achieve this it was necessary to allow unfiltered oil which had not passed the main filter element, to act upon the reverse end of the control valve piston, exerting a thrust equal and opposite to the thrust on the seated valve.

Consequently, in order to prevent unfiltered particles coming into contact with the piston, a small supplementary strainer or filter element was provided which, owing to the fact that the oil was static and not flowing offered no resistance to the exercise of the full pressure of the unfiltered oil upon the piston.

The control piston was thus subject at one end to the pressure of the outgoing filtered oil and at the other end to the higher pressure of the inlet oil. While this was what was required to ensure the correct functioning of the control piston, it had the disadvantage that it entailed a pressure difference between the two ends of the control piston, and thus caused a flow of oil through the clearance space between the piston and its cylinder wall, and although this flow was of extremely small amount, and although again, the inlet oil was passed through a supplementary strainer which cleansed it of much of its suspended matter, there still remained the possibility of fine suspended particles being carried by the oil flow into the clearance space, and there causing friction and possible ultimate failure.

The present invention provides a filter which comprises a container, a filter element therein and a filter head which comprises an oil inlet, through which unfiltered oil is supplied to the unfiltered oil space in the container, a main outlet for filtered oil, which communicates with the filtered oil space in the container, and a subsidiary outlet for unfiltered oil, the filter being characterised by a control valve device or unit which is arranged in the filter head and comprises a reciprocable valve which is adapted to allow the flow of unfiltered oil from the filter to a sump or other container through the subsidiary outlet when the pressure of the filtered oil in the main outlet exceeds a predetermined figure, the valve having a head which cooperates with a valve seat surrounding a passage in the device which communicates permanently with the oil inlet side of the filter and which, when the valve is unseated, communicates with the subsidiary outlet, thereby permitting unfiltered oil from the filter to return to the sump or other container, and a deformable member which is operatively connected to the valve and is exposed on one side to the filtered oil pressure and on the other side to the unfiltered oil pressure, the deformable or movable part of the deformable member, being constrained to move in one direction under the pressure of the filtered oil and to cause the unseating of the valve when the pressure exceeds a predetermined value and in the opposite direction by the thrust of a valve control spring and the pressure of the unfiltered oil. The valve head may be formed with a sharp dirt-cutting edge.

The deformable member may consist of a diaphragm, capsule or equivalent device but it is preferred to use a bellows device. The filtered oil may be caused to act either on the outside or in the inside of the bellows device.

The valve head may be mounted upon a valve spindle which is subjected to the thrust due to the pressure of the filtered oil acting either on the outside or in the inside of the bellows device, to the thrust due to the pressure of the unfiltered oil acting on the reverse side of the bellows device and on the valve head, and also to the thrust of the valve control spring.

In one construction, unfiltered oil is admitted to the interior of the bellows device through a passage which is permanently connected to the unfiltered oil inlet and which is adapted to communicate with the subsidiary outlet when the valve head is unseated, the pressure of the filtered oil being communicated to the outside of the bellows device through a passage which is permanently connected to the main outlet for filtered oil.

In an alternative construction, unfiltered oil is admitted to the exterior of the bellows device through a passage which is permanently connected to the unfiltered oil inlet and which is adapted to communicate with the subsidiary outlet when the valve is unseated, the pressure of the filtered oil being communicated to the inside of the bellows device through a passage which is permanently connected to the main outlet for filtered oil.

It is preferred to fit the valve, the valve spindle, the bellows device and the valve control spring in an envelope or housing of cartridge form which is adapted to be fitted in a housing in the filter head, and which can be removed as a complete unit, the envelope also enclosing or including a valve seat member, with which the valve cooperates and being formed with one or more ducts which is or are in permanent communication with the unfiltered oil inlet and which is or are adapted to communicate through the valve seat member, with the subsidiary outlet when the valve is unseated, and a closure member which is axially spaced from the valve seat member and which is formed with ducts which are permanently connected to the main outlet for filtered oil, the bellows device being fitted around the valve spindle and arranged between the valve seat member and the closure member, one or more ports in the wall of the envelope providing communication between the duct or ducts which is or are in communication with the unfiltered oil inlet and one or more ports in the envelope which provide communication between the ducts in the closure member and the main outlet for filtered oil.

Several constructional forms of the invention, all applied to oil filters for use on engines or machinery, are described hereinafter with reference to the accompanying drawings, whereon.

Referring first to Figures 1 to 4:

An oil filter made in accordance with the invention may comprise a head 1 having an inlet 2 for unfiltered oil, an outlet 3 for filtered oil, a mounting for the control valve envelope or housing 4 and a container 5, which encloses the annular filter element 6. The container is detachably attached to the head by means of a centre bolt 7 which extends through the head and the filter element and screws at its bottom end into a boss 8 projecting upwardly from the base of the container. Unfiltered oil entering the container through the inlet first fills the annular space around the filter element and then flows inwardly through the latter to the outlet 3 in the filter head and thence to the bearings.

In this particular construction, the head is formed with a lateral flat face 9 which is designed to form a joint with a corresponding flat face on the engine or machine upon which the filter is used. The inlet passage 2 for unfiltered oil in the head communicates with an inlet space 2a behind this flat face and is connected through the said face to an oil circulating pump.

The outlet passage 3 for filtered oil in the head surrounds the centre bolt and communicates with an outlet space 3a behind the flat face on the head through which it is connected to the bearings to be lubricated. The flat face is also formed with an auxiliary outlet space or port 10 which is connected to a sump or other container, and the purpose of which will be described hereinafter.

The envelope or housing 4 is externally threaded and it is formed with filtered oil inlet ports 11, unfiltered oil inlet ports 12 and an unfiltered outflow oil passage 13. The envelope is screwed into a housing in the filter head which is formed towards the top of the head and between the flat face 9 of the head and the centre bolt 7.

The housing comprises threaded apertures in the boundary wall 14 of the head and in the internal partition walls 15 and 16 which divide the filtered oil outlet passage 3a, the unfiltered oil inlet passage 2a and the unfiltered oil outflow passage 10 from one another. The arrangement is such that when the envelope is screwed into position in the head, the unfiltered oil inlet ports 12 in the envelope communicate with the unfiltered oil inlet passage 2a, the filtered oil ports 11 in the envelope communicate with the filtered oil outlet port 3a and the unfiltered oil outflow passage 13 communicates with the passage 10 for the unfiltered oil return to the sump or other container.

The envelope is counterbored at its left hand end to provide a shoulder 19 against which is fitted the head part 20 of a hollow valve seat member having an integral shank 21 which is fitted in the bore of the envelope. The valve seat member is held in position by a C-ring 22 fitted in a groove 23 formed in the counterbore. The envelope is also counterbored at its opposite end to provide a shoulder 24 against which a hollow closure member 25 is fitted, being held in position by a C-ring 26 fitted in a groove 27 in the counterbore. Oil-tight engagement between the valve seat member and the envelope is obtained by flexible sealing rings 28 and 29 fitted in annular grooves 30 and 31 in the valve seat member. Oil-tight engagement is obtained between the closure member 25 and the envelope by means of a flexible sealing ring 32 fitted in an annular groove 33 formed in the closure member.

A valve spindle 34, coaxial with the envelope 4 is arranged inside the latter with its left hand end projecting through the bore of the valve seat member. A metal, mushroom-shaped valve head 35 which preferably is hardened is mounted on the left hand end of the valve spindle within the left hand counterbore formed in the envelope between the head 20 of the valve seat member and the adjacent end of the envelope. The end of the valve head 35 facing the outer flat face of the valve seat member is formed with a conical recess 36 so as to provide the valve head with a sharp dirt-cutting edge 37.

At its inner end the shank 21 of the valve seat member is provided with a boss 39 in which one end of the metal bellows 40 is fitted and attached as by soldering. This boss may either be integral with the valve seat member as shown or may be in the form of a separate ferrule screwed in.

The opposite end of the bellows is attached, as by soldering, to a flange 41 formed integrally upon the valve spindle 34. One end of a control spring 42 bears against a shoulder 43 on a sleeve member 44 which is slidably mounted upon the valve spindle and is held against or adjacent to the flange 41 by means of a clip 45. The sleeve member also slides in the bore 46 of the closure plug 25, thus constituting a guide for the outer end of the valve spindle.

A straight groove 47 is cut in the sleeve member in order to admit the filtered oil pressure to the space 46a within the closure member and thus to ensure equalisation of oil pressure between the two ends of the sleeve member 44. Alternatively, the groove 47 may take the form of a spiral groove or a drilled hole.

Thus, there being no pressure difference between the two ends of the said sleeve member there is no tendency for oil carrying suspended particles to flow through the clearance spaces between the sleeve member and the guide.

Further, in ordinary commercial practice, it may be safely assumed that filtered oil does not contain particles greater than .001 inch in diameter, and since a much larger clearance of the order of .005 inch between the diameter of the sleeve member and the bore of the guide is generally quite permissible, it is obvious that, even if stray particles do penetrate into these clearance spaces, they can not cause the valve spindle to stick.

The opposite end of the control spring 42 bears against a shoulder 48 formed in the shank part 21 of the valve seat member.

The unfiltered oil inlet ports 12 in the envelope communicate with an annular groove 50 formed in the valve seat member which recess in turn communicates with the bore of the valve seat member through transverse ports 51. The filtered oil inlet ports 11 in the envelope communicate with the space in the interior of the envelope surrounding the bellows through an annular groove 52 and longitudinal ports 53 formed in the closure member 25.

Into the bore of the valve seat member, through which the valve spindle 34 passes, a felt washer or sleeve 54 is introduced for the double purpose of acting as a partial guide for the spindle, which is slidable in it and also as a filter permitting the oil pressure to reach the bellows but preventing suspended matter in the unfiltered oil from reaching them, filling their convolutions and thus impairing their freedom of action. The felt washer or sleeve is conveniently held in place on one side by a shoulder in the bore of the valve seat member and by a C-ring on the other side.

The control spring 42 urges the spindle 34 and the valve 35 in the direction of the valve seat, which latter is constituted by the flat face 20a of the said valve seat member 20. The bore of the latter forms an outflow port for the unfiltered oil which enters the envelope through the ports 12 formed in the wall of the envelope and through the recess 50 and the ports 51 in the latter.

The effective diameter of the dirt-cutting edge 37 of the valve member 35 is equal to the effective diameter of the bellows 40, so that the pressure of the unfiltered oil acts upon the valve head and the bellows equally in opposite directions, the thrusts in the two directions being balanced, and the resultant thrust thus being nil. The valve 35 is therefore held on its seat solely by the thrust of the coil spring 42, which thrust is opposed by the pressure of the filtered oil passing to the bearings acting through the ports 11, the recess 52 and the ports 53 upon the outside of the bellows.

The spring is so adjusted that, when the pressure on the bearing oil reaches a predetermined value, its thrust is overcome and the whole valve assembly is forced away from the closure member, thus opening the valve, and permitting unfiltered oil to be by-passed through the outflow passage 13 in the envelope back to the sump.

The operation of this construction is as follows:

As the bellows 40 is of the same effective diameter as the valve 35, and as they are both subjected to the pressure of the unfiltered oil, the effect of this pressure is balanced and the action of the valve is not affected by it. The valve 35 and its spindle 34 are acted upon by the thrust of the control valve spring 42 which serves to keep the valve shut, and the pressure of the filtered oil acting on the outside of the bellows to thrust the valve open. The arrangement is such that when the predetermined pressure is reached, the thrust due to the filtered oil pressure overcomes the thrust of the spring and forces the valve open, releasing unfiltered oil and permitting it to return to the sump or other container for the purpose mentioned above.

Figure 1:
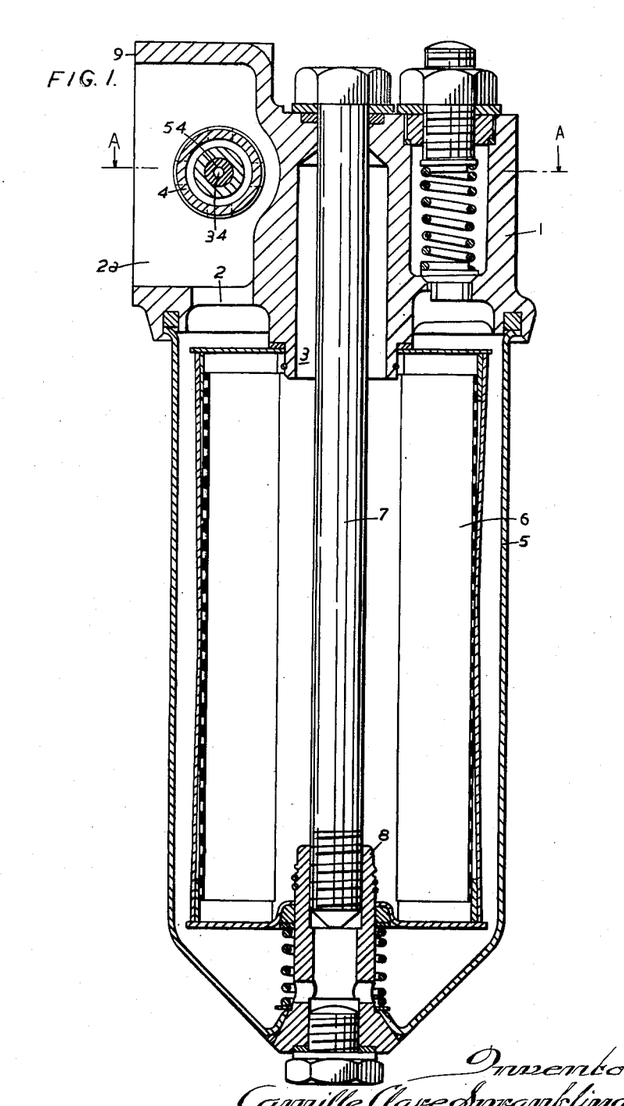
Figure 1 is a medial sectional view of a filter fitted with a control valve member in which unfiltered oil is admitted to the interior of the valve-controlling bellows device, while the pressure of filtered oil acts upon the outside of that device.
Figure 2:
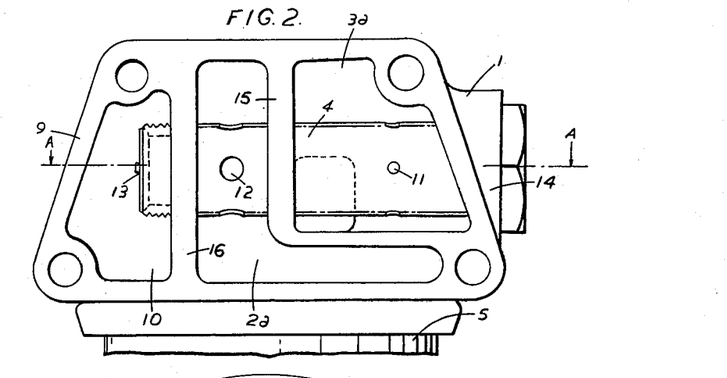
Figure 2 is a fragmentary outside elevation of the filter head and container of the filter shown in Figure 1.
Figure 3:
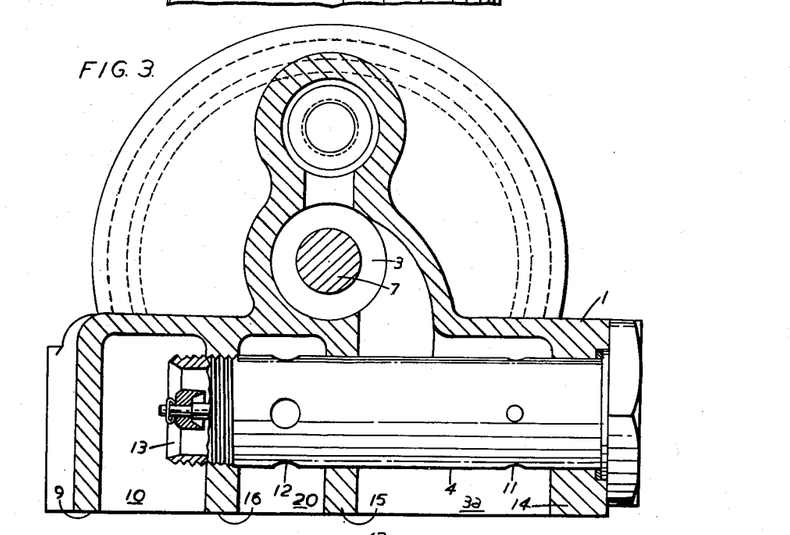
Figure 3 is a section on the lines A—A in Figures 1 and 2.
Figure 4:
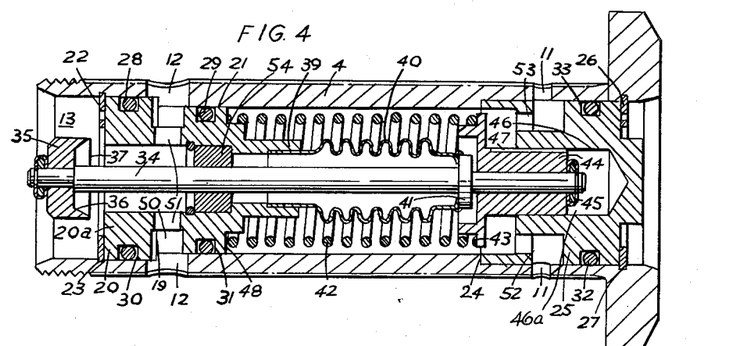
Figure 4 is an enlarged sectional view of the control valve unit shown in Figure 3.
Figure 5:
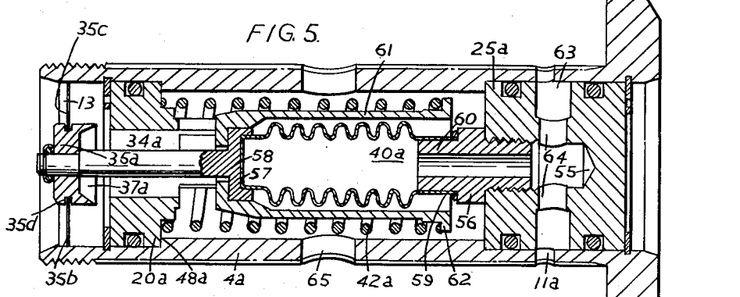
Figure 5 is a sectional view of a modified form of control valve unit in which unfiltered oil is admitted to the exterior of the bellows device, while the pressure of filtered oil acts upon the inside of that device.

In the modified construction shown in Figure 5, the pressure of the filtered oil is communicated to the interior of the bellows while unfiltered oil is admitted to the space in the envelope surrounding the bellows.

The construction again comprises a valve head 35a fixed upon the left hand end of the valve spindle 34a and having a sharp dirt-cutting edge 37a adapted to cooperate with the adjacent flat face of the valve seat member 29a. The valve head is flexibly guided by means of a diaphragm flexible guide member stamped from thin sheet spring steel and comprising a rim 35b which is an easy sliding fit in the counterbore in which the valve seat member 29a is fitted. The rim is integral with three radial arms 35c which are sprung into a groove 35d formed in the valve head. Thus, should dirt or a hair of felt lodge between the rim 35b and the wall of the counterbore causing the guide member to stick, it would still flex and permit the valve head to function correctly. The construction also comprises a closure member 25a which, however, is formed with an axial recess 55 into which is screwed the threaded end of a hollow ferrule 56. The closed left hand end of the bellows 40a is soldered into a recess 57 in a flange 58 on the spindle and the opposite end is in the form of a neck 59 which is soldered upon a spigot part 60 of the hollow ferrule. The flange 58 is fitted in a recess in the end of a hollow sleeve member 61 having an outwardly-turned flange 62 at its opposite end, and the control spring 42a reacts between the said flange and a shoulder 46a on the valve seat member 29a.

The pressure of the filtered oil is admitted to the interior of the bellows through filtered oil inlet ports 11a in the envelope, an annular recess 63, transverse ports 64, the axial recess 55 in the closure member and the bore of the hollow ferrule 56.

Unfiltered oil is admitted to the space in the envelope between the valve seat member 29a and the closure plug 25a, surrounding the bellows, through ports 65 formed in the wall of the envelope 4a. In this construction, the pressure of the filtered oil inside the bellows serves to thrust the valve 35a open while the pressure of the spring 42a serves to thrust the valve towards the closed position.

Figure 6:
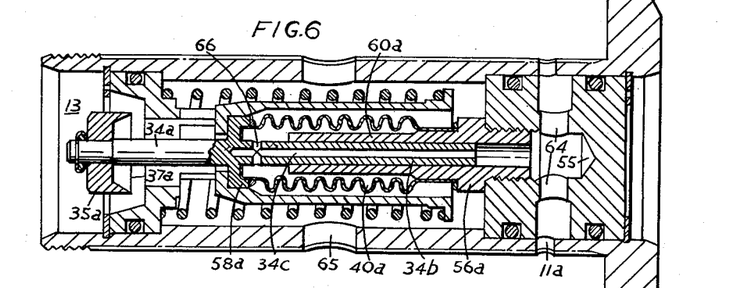
Figure 6 is a sectional view of a modification of the control valve member shown in Figure 5.

In another modification, shown in Figure 6, the spigot part 60a of the hollow ferrule 56a extends into, and nearly the full length of the bellows and is accurately bored. The valve spindle 34a is also extended at 34b in the opposite side from the integral flange 58a on the spindle the full length of the bellows towards the closure plug and is slidably fitted in the bore of the spigot part 60a, this bore thus constituting a guide for the extension of the valve spindle. A channel 34c is formed through the spindle extension 34b and terminates close to the flange 58a in cross ports 66 or, alternatively, a spiral, or straight, groove is cut in the side of the spindle, for the purpose of communicating the filtered oil pressure to the inside of the bellows.

Thus, there is no pressure difference between the two ends of the said guide, and as previously explained there is no tendency for the valve spindle to stick.

Figure 7:
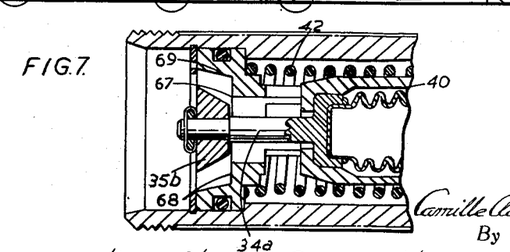
Figure 7 is a fragmentary sectional view of a modification of the control valve member shown in Figure 5, in which the control valve is of conical section.

It is also anticipated that in some cases the bellows can be made sufficiently rigid in the lateral direction, while still remaining flexible in the axial direction, that they can themselves serve to carry the valve member without any guide at all. In this case, the valve head member 35b as shown in Figure 7 is preferably of conical form and may have a total inclined angle of substantially 90 degrees, while the inner edge 67 of the valve seat member, where the flat surface 68 intersects the bore 69 may be suitable shaped so that it serves as a dirt-cutting edge. Such a valve would be self centering at the moment of closing. This valve construction may also be used in any of the constructions described herein.

Figure 8:
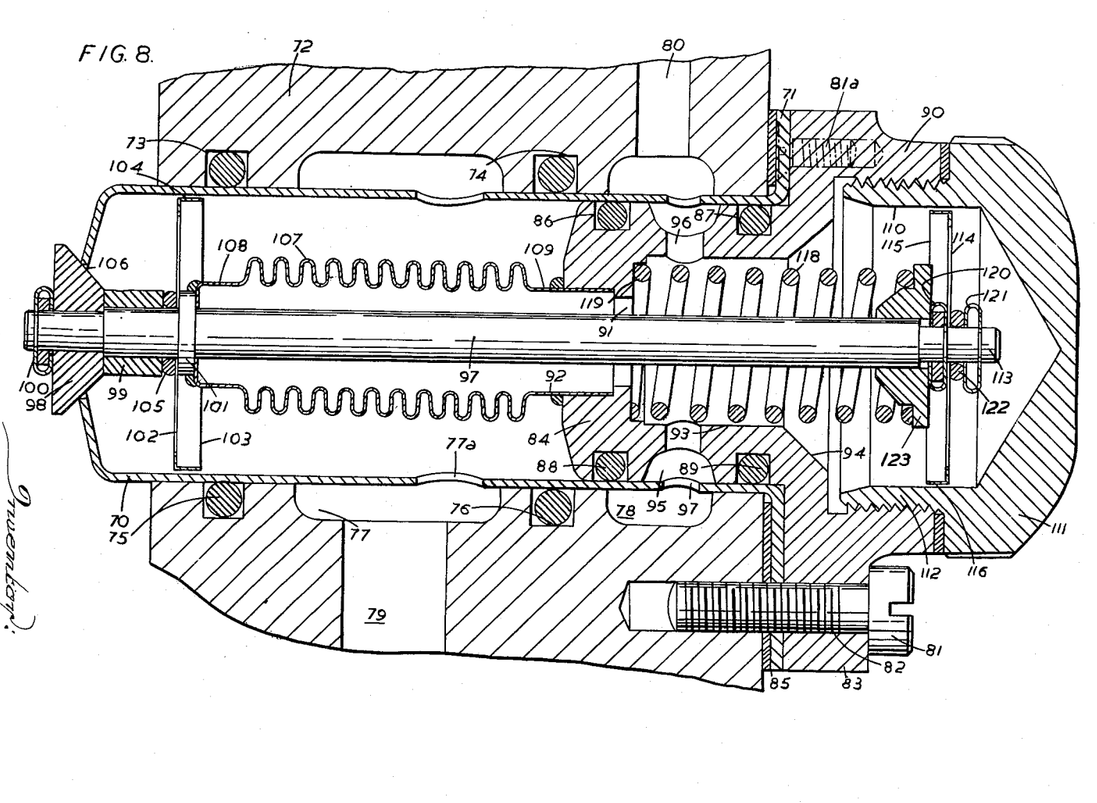
Figure 8 is a sectional view of another construction in which filtered oil is admitted to the interior of the bellows device and in which the envelope of the control valve unit consists of a metal pressing and the control valve spring is not fitted around the bellows device but reacts between a closure member for the shell and an abutment on the valve spindle.

A further construction in which filtered oil is admitted to the interior of the bellows is shown in Figure 8. This construction comprises a metal envelope or shell 70 in the form of a deep pressing having an outwardly-turned flange 71. The shell is fitted in a housing 72 which is provided on the filter head and which comprises two annular grooves 73 and 74 in which flexible sealing rings 75 and 76 are fitted. The housing is also provided with a wide annular duct 77 and a narrower annular duct 78. The duct 77 is supplied with unfiltered oil from the oil pump through an unfiltered oil port 79 which is connected to the outlet from the pump. The duct 78 is supplied with filtered oil through a filtered oil inlet port 80.

The shell 70 is held in position in its housing by screws 81 which pass through holes 82 in the flange 83 of a hollow closure member 84 and are screwed into threaded holes in the housing. The screws pass through holes in the flange 71 of the shell and a flexible washer 85 is fitted between the flange 71 and the outer flat face of the housing in order to ensure a liquid tight joint. Subsidiary screws 81a hold the closure member 84 and the shell 70 together after the main screws 81 have been removed for withdrawing the whole unit.

The closure member 84 is formed with two axially-spaced annular grooves 86 and 87 in which flexible sealing rings 88 and 89 are fitted. The closure member comprises a hollow boss 90 which is internally threaded and the member is also formed with a bore 91, which is counterbored at 92, and with an enlarged bore 93 having a flared mouth 94.

Between the annular grooves 86 and 87, the closure member is formed with an annular recess 95 and with transverse ports 96 and the shell is formed with ports 97 which provide communication between the filtered oil duct 78 and the recess 95 and thus allow filtered oil to enter the bore 93 in the closure member through the recess and the ports 96.

The unfiltered oil duct 77 communicates with the interior of the shell through ports 77a formed in the wall of the latter.

The control valve spindle extends axially through the shell and at its left hand end it is fitted with a conical section valve head 98 which is held in position on the reduced end of the spindle between a distance piece 99 and a spring clip 100. The spindle is formed with a flange 101 against which the central part 102 of a flexible disc guide 103, having a flange 104 which is slidably fitted in the shell, is fitted. A flexible ring 105 is fitted around the valve spindle between the flexible guide member and the distance piece 99, the guide member thus being flexibly held against the flange 101. The control valve 98 is adapted to open and close an opening 106 in the end of the shell 70, the perimeter of which opening forms a sharp dirt-cutting valve seat for the conical side of the valve.

The bellows 107 surrounds the spindle, its spigot end 108 being fixed, as by soldering, to the flange 101. The opposite end, or neck, 109 of the bellows fits in the counterbore 92 in the closure member 84 and it is fixed therein as by soldering.

The right hand end of the valve spindle projects into a recess 110 which is machined axially in a closure cover 111, the shank 112 of which is externally threaded in order that it may be screwed into the threaded bore of the hollow boss 90 of the closure member 84. The right hand end of the spindle is reduced in diameter at 113 and upon this reduced part there is fitted a flexible disc guide member 115, which in this case is formed with a flange 116 which is slidably guided in the bore 110 of the closure cover 111. This guide member is flexibly secured upon the spindle between two clips 120 and 121, a flexible distance piece 122 being incorporated as previously described.

The control spring 118 reacts between the shoulder 119 at the bottom of the bore 93 of the closure member and a neck piece 123 which is slidable on the spindle and butts against the said spring clip 120.

Each of the flexible guide members 103 and 115 is sufficiently flexible that in the event of its peripheral guide flange 104 or 116 meeting an obstruction, such as grit or hair, and sticking, the central part to which the valve spindle is attached can still move in the required, i. e., axial, direction sufficiently to permit the moving parts to function without seriously affecting the action of the valve 98. In the construction shown in the drawing the central parts of the discs are formed to provide radial or spiral arms which provide the required flexibility. It will be appreciated, however, that other forms of flexible guide members could be used, such as those comprising or consisting of a number of separate flexible fingers which are fixed to the valve spindle and the outer tips of which are arranged to ride over any small obstruction they may encounter in the guide bore.

In this construction, unfiltered oil from the pump enters the space in the shell surrounding the bellows through the port 79, the unfiltered oil duct 77 and the ports 77a in the shell. The pressure of this unfiltered oil acts to thrust the control valve 98 open and discharge the oil through the opening 106 to the sump or other container. The pressure of this unfiltered oil is also exerted in the opposite direction upon the bellows 107 which have an effective diameter equal to that of the valve 98, so that these forces being in equilibrium, the valve 98 is insensitive to the unfiltered oil pressure.

Filtered oil, at bearing pressure, is admitted to the interior of the bellows 107 through the port 80, the filtered oil duct 78 in the housing 72, the ports 97 in the shell 70, the annular recess 95, the ports 96 and the bores 93 and 91 in the closure member 84. The pressure of the filtered oil is thus exerted in the bellows in a direction to thrust the valve 98 off its seat, this thrust being opposed by the spring 118 acting in the opposite direction. Therefore, the valve 98 is sensitive only to the pressure of the filtered oil passing to the bearings and when this pressure reaches, or exceeds, a predetermined value, the valve is forced off its seat and permits unfiltered oil to pass through the opening 106 in the shell to the sump or other container.

Figure 9:
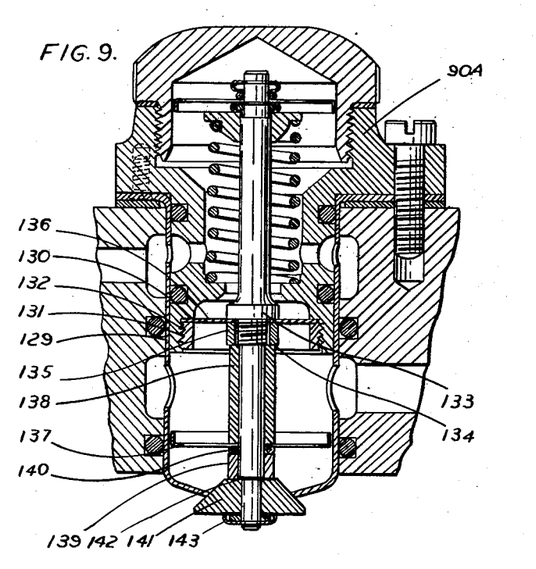
Figure 9 is a sectional view of another construction similar to that shown in Figure 8 but in which the flexible bellows is replaced by a flexible diaphragm.

Referring to Figure 9, the shell, valve head, valve spindle, closure member, cover and the control spring are all the same as in the construction shown in Figure 8 with the following exceptions:

At its left hand end the closure member 90A is extended somewhat at 129 and is counterbored to form a shoulder 130, threaded at 131 and fitted with a ring nut 132. The valve spindle is formed with a shoulder 133 and with a short threaded part 134 adjacent thereto, upon which is screwed a nut 135.

A flexible diaphragm 136 preferably made of rubber, synthetic rubber or similar material, is held at its centre between the shoulder 134 and the nut 135 and is held at its edge between the shoulder 130 and the ring nut 132.

The spindle is guided by a flexible disc 137 which is secured to the spindle between two distance pieces 138 and 139, a flexible ring 140 being incorporated between the distance pieces to provide flexibility of mounting. The valve 141 is held in position on the valve spindle against its shoulder 142 by a spring clip 143 as in the construction shown in Figure 8.

Figure 10:
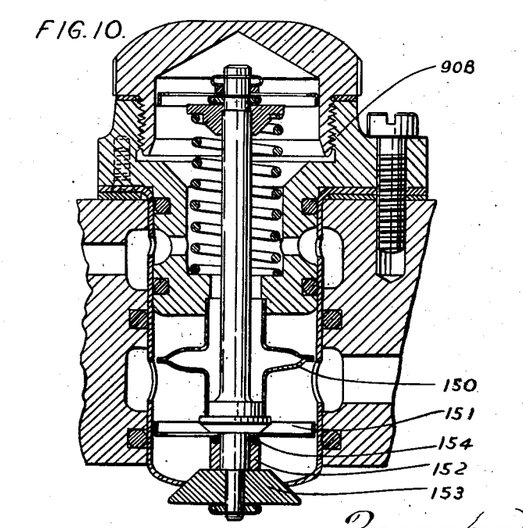
Figure 10 is a sectional elevation of another construction similar to that shown in Figures 8 and 9 but in which the flexible member is in capsule form.

Referring to Figure 10, the constructional details of this construction again are similar to the constructions shown in Figures 8 and 9, but in this case a capsule 150 is attached, as by soldering, to the closure member 90B at one end and to the valve spindle at the other end. The flexible guide disc 151 is secured, as before, by means of a distance piece 152 between itself and the valve head 153, a flexible ring 154 being incorporated as before to secure flexibility.

The operation of the constructions shown in Figures 9 and 10 will be quite clear from the description of the operation of the constructions shown in Figures 1 to 8.

I claim:

1. A filter having a container, a filter element therein, an unfiltered oil space in said container, a filtered oil space in said container, means forming a filter head having an oil inlet through which unfiltered oil is supplied to said unfiltered oil space, a main oil outlet through which filtered oil is withdrawn from said filtered oil space, and a subsidiary outlet for unfiltered oil characterized by a flow control unit in said head, said unit including a body part having an unfiltered oil space formed therein, a passage permanently connecting said inlet for unfiltered oil to said unfiltered oil space in said unit, a passage connecting said unfiltered oil space in said unit to said subsidiary outlet, a valve seat at the outlet end of said last mentioned passage, a reciprocably mounted control valve associated with said valve seat, the side of said valve adjacent to said valve seat being exposed to the pressure of the unfiltered oil which thrusts the valve in a direction to cause the unseating of the valve whereby unfiltered oil may flow from said space through said passage to said subsidiary outlet, resilient means adapted to thrust said control valve in a direction opposite to the thrust of the unfiltered oil thereon onto said valve seat to close communication between said passage and said space for unfiltered oil in said unit, a deformable member in said body part, means connecting said deformable member with said control valve so that each movement of said deformable member is transmitted to said valve, one side of said deformable member being exposed to the pressure of the unfiltered oil, the force exerted by said pressure being equal and opposite to the force exerted by unfiltered oil upon said side of the control valve adjacent to said valve seat, and the other side of said deformable member being exposed to the pressure of the filtered oil, whereby said deformable member and said control valve operatively connected thereto are moved in one direction when the filtered oil pressure exceeds a predetermined value and are moved in the opposite direction by the thrust of said resilient means.

2. A filter having a container, a filter element therein, an unfiltered oil space in said container, means forming a filter head having an oil inlet through which unfiltered oil is supplied to said unfiltered oil space, a filtered oil space in said container, a main outlet in said head for filtered oil, said outlet communicating with said filtered oil space, and a subsidiary outlet in said head for unfiltered oil, characterized by a flow control unit mounted in said filter head and comprising a body part, an unfiltered oil space in said body part, means connecting said space to said subsidiary outlet, a passage for unfiltered oil in said body part, means permanently connecting said passage to said inlet for unfiltered oil, the outlet end of said passage communicating with said unfiltered oil space and said subsidiary outlet, a valve seat at the outlet end of said passage, a control valve reciprocally mounted in said body part and associated with said valve seat to open said passage when moved in one direction whereby unfiltered oil may flow from said passage into said space connected to said subsidiary outlet and to close said passage when moved in the opposite direction, resilient means adapted to thrust said control valve onto said valve seat, a deformable member in said body part, means connecting said deformable member with said control valve so that each movement of said deformable member is transmitted to said valve, a space defined in part by said deformable member for filtered oil in said body part, means connecting said last mentioned space to said main outlet for filtered oil, one side of said deformable member being exposed to said space for unfiltered oil, whereby said deformable member is moved in one direction under the pressure of the filtered oil to open said control valve when the filtered oil pressure exceeds a predetermined value and is moved in the opposite direction by the thrust of said resilient means.

3. A filter having a container, a filter element in the container, means forming a filter head secured to the container, the filter head including a plurality of partitions dividing the head into an inlet for unfiltered liquid, an outlet for filtered liquid and a subsidiary outlet for unfiltered liquid, an inlet port connecting the inlet with the interior of said container on one side of the filter element, and an outlet passage connecting the interior of said container on the other side of the filter element with the outlet for filtered liquid characterized by a device for controlling the flow of liquid from the inlet to the outlets, said device comprising a housing extending through and supported by the partitions, a bellows having its open end immovably secured in said housing and dividing said housing into two chambers, an unfiltered liquid inlet port connecting one of said chambers with the filter inlet, a filtered liquid inlet port connecting the other of said chambers with the filtered liquid outlet, the pressure of the unfiltered liquid in said first mentioned chamber acting on one side of said bellows and the pressure of the filtered liquid in said other chamber acting on the other side of said bellows, an unfiltered liquid outlet port connecting said first mentioned chamber with the subsidiary outlet, a valve member normally closing said outlet port, means connecting said valve member to the closed end of said bellows so that each movement of said closed end is transmitted to said valve member, and resilient means acting on the closed end of said bellows to bias said valve member to closed position, the effective area of said valve member being equal to the effected area of said bellows so that the thrust exerted by the pressure of the unfiltered liquid on said valve member is equal to the thrust exerted by the pressure of the unfiltered liquid on said bellows, whereby said valve member is held in its closed position solely by the thrust of said resilient member and the rise in pressure of the filtered liquid in said other chamber and at the filtered liquid outlet above a predetermined valve will move the closed end of said bellows and said valve member against said biasing means to move said valve member to open position.

4. A liquid flow controlling device for use with a liquid filter of the type having an inlet for unfiltered liquid, an outlet for filtered liquid, and an outlet for unfiltered liquid, said flow controlling device comprising in combination a housing, a deformable member in said housing dividing said housing into two chambers, an unfiltered liquid inlet port in one of said chambers, a filtered liquid inlet port in the other of said chambers, the pressure of the unfiltered liquid in said first mentioned chamber acting on one side of said deformable member and the pressure of the filtered liquid in said other chamber acting on the other side of said deformable member, an outlet port for unfiltered liquid in said first mentioned chamber, a valve member normally closing said outlet port, means connecting said valve member to said deformable member so that movements of said deformable member are transmitted to said valve member, and means acting on said deformable member to bias said valve member to closed position, the effective area of said valve member being equal to the effective area of said deformable member so that the thrust exerted by the pressure of the unfiltered liquid on said valve member is equal to the thrust exerted by the pressure of the unfiltered liquid on said deformable member, whereby said valve member is held in its closed position solely by the thrust of said biasing means and a rise in pressure of the filtered liquid in said other chamber above a predetermined value will move said deformable member and said valve member against said biasing means to move said valve member to open position.

5. A liquid flow controlling device for use with a liquid filter of the type having an inlet for unfiltered liquid, an outlet for filtered liquid, and an outlet for unfiltered liquid, said flow controlling device comprising in combination a housing, a bellows having its open end immovably secured in said housing and dividing said housing into two chambers, an unfiltered liquid inlet port in one of said chambers, a filtered liquid inlet port in the other of said chambers, the pressure of the unfiltered liquid in said first mentioned chamber acting on one side of said bellows and the pressure of the filtered liquid in said other chamber acting on the other side of said bellows, an outlet port for unfiltered liquid in said first mentioned chamber, a valve member normally closing said outlet port, means connecting said valve member to the closed end of said bellows so that each movement of said closed end is transmitted to said valve member, and resilient means acting on the closed end of said bellows to bias said valve member to closed position, the effective area of said valve member being equal to the effective area of said bellows so that the thrust exerted by the pressure of the unfiltered liquid on said valve member is equal to the thrust exerted by the pressure of the unfiltered liquid on said bellows, whereby said valve member is held in its closed position solely by the thrust of said resilient means and a rise in pressure of the filtered liquid in said other chamber above a predetermined value will move the closed end of said bellows and said valve member against said biasing means to move said valve member to open position.

6. A liquid flow controlling device for use with a liquid filter of the type having an inlet for unfiltered liquid, an outlet for filtered liquid, and an outlet for unfiltered liquid, said flow controlling device comprising in combination a housing, a bellows having its open end immovably secured in said housing and dividing said housing into two chambers, an unfiltered liquid inlet port in one of said chambers, a filtered liquid inlet port in the other of said chambers, the pressure of the unfiltered liquid in said first mentioned chamber acting on one side of said bellows and the pressure of the filtered liquid in said other chamber acting on the other side of said bellows, an outlet port for unfiltered liquid in said first mentioned chamber, said bellows being arranged in said housing so that said first mentioned chamber includes the interior of said bellows, a valve member normally closing said outlet port, means connecting said valve member to the closed end of said bellows so that each movement of said closed end is transmitted to said valve member, and resilient means acting on the closed end of said bellows to bias said valve member to closed position, the effective area of said valve member being equal to the effective area of said bellows so that the thrust exerted by the pressure of the unfiltered liquid on said valve member is equal to the thrust exerted by the pressure of the unfiltered liquid on said bellows, whereby said valve member is held in its closed position solely by the thrust of said resilient means and a rise in pressure of the filtered liquid in said other chamber above a predetermined value will move the closed end of said bellows and said valve member against said biasing means to move said valve member to open position.

7. A liquid flow controlling device for use with a liquid filter of the type having an inlet for unfiltered liquid, an outlet for filtered liquid, and an outlet for unfiltered liquid, said flow controlling device comprising in combination a housing, a bellows having its open end immovably secured in said housing and dividing said housing into two chambers, an unfiltered liquid inlet port in one of said chambers, a filtered liquid inlet port in the other of said chambers, the pressure of the unfiltered liquid in said first mentioned chamber acting on one side of said bellows and the pressure of the filtered liquid in said other chamber acting on the other side of said bellows, an outlet port for unfiltered liquid in said first mentioned chamber, said bellows being arranged in said housing so that said other chamber includes the interior of said bellows, a valve member normally closing said outlet port, means connecting said valve member to the closed end of said bellows so that each movement of said closed end is transmitted to said valve member, and resilient means acting on the closed end of said bellows to bias said valve member to closed position, the effective area of said valve member being equal to the effective area of said bellows so that the thrust exerted by the pressure of the unfiltered liquid on said valve member is equal to the thrust exerted by the pressure of the unfiltered liquid on said bellows, whereby said valve member is held in its closed position solely by the thrust of said resilient means and a rise in pressure of the filtered liquid in said other chamber above a predetermined value will move the closed end of said bellows and said valve member against said biasing means to move said valve member to open position.

8. A liquid flow controlling device for use with a liquid filter of the type having an inlet for unfiltered liquid, an outlet for filtered liquid, and an outlet for unfiltered liquid, said flow controlling device comprising in combination a housing, a bellows having its open end immovably secured in said housing and dividing said housing into two chambers, an unfiltered liquid inlet port in one of said chambers, a filtered liquid inlet port in the other of said chambers, the pressure of the unfiltered liquid in said first mentioned chamber acting on one side of said bellows and the pressure of the filtered liquid in said other chamber acting on the other side of said bellows, an outlet port for unfiltered liquid in said first mentioned chamber, a valve member normally closing said outlet port, a valve spindle connecting said valve member to the closed end of said bellows for positive action so that the pressure of the unfiltered liquid in said first chamber acting on said valve member tends to move it to open position and acting on said bellows tends to hold said valve member in closed position, and spring means acting on the closed end of said bellows to bias said valve member to closed position, the effective area of said valve member being equal to the effective area of said bellows so that the thrust exerted by the pressure of the unfiltered liquid on said valve member is equal to the thrust exerted by the pressure of the unfiltered liquid on said bellows, whereby said valve member is held in its closed position solely by the thrust of said spring means and a rise in pressure of the filtered liquid in said other chamber above a predetermined value will move the closed end of said bellows and said valve member against said biasing means to move said valve member to open position.

9. A liquid flow controlling device for use with a liquid filter of the type having an inlet for unfiltered liquid, an outlet for filtered liquid, and an outlet for unfiltered liquid, said flow controlling device comprising in combination a housing, a bellows having its open end immovably secured in said housing and dividing said housing into two chambers, an unfiltered liquid inlet port in one of said chambers, a filtered liquid inlet port in the other of said chambers, the pressure of the unfiltered liquid in said first mentioned chamber acting on one side of said bellows and the pressure of the filtered liquid in said other chamber acting on the other side of said bellows, an outlet passage for unfiltered liquid in said first mentioned chamber, a valve seat member in said passage having an outlet port therethrough, said bellows being arranged in said housing so that its open end is connected to said valve seat member and said first mentioned chamber includes the interior of said bellows, a valve member normally closing said outlet port, a spindle connecting said valve member to the closed end of said bellows so that each movement of said closed end is transmitted to said valve member, and a spring reacting between the closed end of said bellows and said valve seat member to bias said valve member to closed position, the effective area of said valve member being equal to the effective area of said bellows so that the thrust exerted by the pressure of the unfiltered liquid on said valve member is equal to the thrust exerted by the pressure of the unfiltered liquid on said bellows, whereby said valve member is held in its closed position solely by the thrust of said spring and a rise in pressure of the filtered liquid in said other chamber above a predetermined value will move the closed end of said bellows and said valve member against said biasing means to move said valve member to open position.

10. A liquid flow controlling device for use with a liquid filter of the type having an inlet for unfiltered liquid, an outlet for filtered liquid, and an outlet for unfiltered liquid, said flow controlling device comprising in combination a housing comprising a sheet metal pressing of generally cylindrical shape having one end closed by a closure member, a bellows having its open end immovably secured in said housing and dividing said housing into two chambers, an unfiltered liquid inlet port in one of said chambers, a filtered liquid inlet port in the other of said chambers, the pressure of the unfiltered liquid in said first chamber acting on one side of said bellows and the pressure of the filtered liquid in said other chamber acting on the other side of said bellows, an outlet port for unfiltered liquid in said first mentioned chamber in the end of said housing opposite said closure member, a conically shaped valve member normally closing said outlet port, a spindle connecting said valve member to the closed end of said bellows so that each movement of said closed end is transmitted to said valve member, and spring means acting on the closed end of said bellows to bias said valve member to closed position, the effective area of said valve member being equal to the effective area of said bellows so that the thrust exerted by the pressure of the unfiltered liquid on said valve member is equal to the thrust exerted by the pressure of the unfiltered liquid on said bellows, whereby said valve member is held in its closed position solely by the thrust of said spring means and a rise in pressure of the filtered liquid in said other chamber above a predetermined value will move the closed end of said bellows and said valve member against said biasing means to move said valve member to open position.

11. A liquid flow controlling device for use with a liquid filter of the type having an inlet for unfiltered liquid, an outlet for filtered liquid, and an outlet for unfiltered liquid, said flow controlling device comprising in combination a housing, a bellows having its open end immovably secured in said housing and dividing said housing into two chambers, an unfiltered liquid inlet port in one of said chambers, a filtered liquid inlet port in the other of said chambers, the pressure of the unfiltered liquid in said first mentioned chamber acting on one side of said bellows and the pressure of the filtered liquid in said other chamber acting on the other side of said bellows, an outlet port for unfiltered liquid in said first mentioned chamber, a valve member normally closing said outlet port, a valve spindle connecting said valve member to the closed end of said bellows so that each movement of said closed end is transmitted to said valve member, at least one flexible guide member slidable in said housing for guiding said valve spindle, and spring means acting on the closed end of said bellows to bias said valve member to closed position, the effective area of said valve member being equal to the effective area of said bellows so that the thrust exerted by the pressure of the unfiltered liquid on said valve member is equal to the thrust exerted by the pressure of the unfiltered liquid on said bellows, whereby said valve member is held in its closed position solely by the thrust of said spring means and a rise in pressure of the filtered liquid in said other chamber above a predetermined value will move the closed end of said bellows and said valve member against said biasing means to move said valve member to open position.

CAMILLE CLARE SPRANKLING LE CLAIR.

References Cited in the file of this patent

UNITED STATES PATENTS

| Number | Name | Date |
|---|---|---|
| 796,506 | Farmer | Aug. 8, 1905 |
| 1,294,151 | Page | Feb. 11, 1919 |
| 2,037,978 | Hansen | Apr. 21, 1936 |
| 2,063,742 | Holmes | Dec. 8, 1936 |
| 2,186,024 | Iler | Jan. 9, 1940 |
| 2,188,643 | Laderer | Jan. 30, 1940 |
| 2,224,101 | Hegwein | Dec. 3, 1940 |
| 2,253,684 | Burckhalter | Aug. 26, 1941 |
| 2,253,685 | Burckhalter | Aug. 26, 1941 |
| 2,260,688 | Orange | Oct. 28, 1941 |
| 2,308,861 | Clifford | Jan. 19, 1943 |
| 2,423,329 | Le Clair | July 1, 1947 |